United States Patent
Robinson

[11] 3,851,463
[45] Dec. 3, 1974

[54] GAS TURBINE ENGINE POWER SHIFT TRANSMISSION POWER TRAIN

[75] Inventor: Donovan L. Robinson, Indianapolis, Ind.

[73] Assignee: General Motors Corporation, Detroit, Mich.

[22] Filed: July 21, 1972

[21] Appl. No.: 273,728

[52] U.S. Cl. ......... 60/39.16, 74/DIG. 5, 60/39.28 R, 60/39.28 P
[51] Int. Cl. .............................................. F02c 3/10
[58] Field of Search ................. 60/39.16 R, 39.16 S; 70/DIG. .005

[56] References Cited
UNITED STATES PATENTS

| | | | |
|---|---|---|---|
| 2,953,940 | 9/1960 | Slemmons | 74/DIG. .005 |
| 3,093,010 | 6/1963 | Spreitzer | 74/DIG. .005 |
| 3,237,404 | 3/1966 | Flanigan | 60/39.16 SI |
| 3,367,106 | 2/1968 | Robinson | 60/39.16 R |
| 3,425,299 | 2/1969 | Fisher | 74/DIG. .005 |

Primary Examiner—Clarence R. Gordon
Attorney, Agent, or Firm—A. M. Heiter

[57] ABSTRACT

A power train having a gas turbine engine with controlled power transfer between the load turbine drive train and the compressor turbine drive train and a power shift transmission is shown. The engine control system includes a fuel control responsive to input and output speeds and compressor discharge pressure and an output power characteristic, horse power and torque, program control responsive to compressor and auxiliary torque and speed controlling the power transfer clutch between the compressor and engine to maintain proper turbine inlet temperature at a proper constant high value in a wide range of operation for optimum efficiency. Overcontrols responsive to acceleration and the temperature of the power transfer clutch and ambient air are provided. The power shift transmission control pressure is controlled by compressor discharge pressure and engine output or transmission input speed to provide a shift actuating pressure proportional to the torque produced by the engine. The shift actuating pressure acts on ratio establishing devices to provide engagement with a speed and force having the same proportion to pressure and thus to torque for uniformly smooth shifting. The engine, during overrun, provides increased engine braking. The engine control provides an overrun signal for engine transfer clutch control and transmission pressure control for smooth shifting. The overrun signal cuts off the governor pressure reduction signal to increase transmission pressure or increase the bias force on the transmission regulator valve to increase transmission pressure on overrun.

15 Claims, 4 Drawing Figures

GAS TURBINE ENGINE POWER SHIFT TRANSMISSION POWER TRAIN

This invention relates to a power train and particularly a gas turbine engine having programmed power and torque characteristics and a power shift transmission having related programmed shaft characteristics.

In this invention, the gas turbine engine has operating controls to maintain the gas temperature at the turbine inlet at a proper consistent high value for maximum efficiency and provide programmed engine power and torque output characteristics. The operating controls include a manual fuel feed control regulated by compressor discharge pressure and compressor speed and a power transfer control regulating the transfer of power between the output load turbine drive train and the compressor turbine drive train in response to compressor and auxiliary torque, compressor speed and a calculated program to provide proper consistent high gas temperature at the inlet to the turbines for maximum efficiency. The compressor turbine drive train includes the compressor turbine, the compressor, the auxiliaries and connecting shafts, one being connected to one side of a power transfer clutch. The output load turbine drive shaft includes the output turbine, the connected output shaft, transfer gearing and a shaft connected to the other side of the power transfer clutch. The turbine engine control in providing consistent or constant gas temperature at the turbine inlet also provides programmed engine output power and torque. The torque output varies as a function of compressor speed and turbine speed as controlled by the manual fuel feed. The power shift transmission has a plurality of drive establishing devices selectively operated by manual or other means for shifting between a plurality of drives. Each drive establishing device provides drive establishment in response to pressure change and the shift characteristics, engagement force, rate of slip and rate of change of slip have the same relationship or vary with the same function of pressure change. Since the required shift characteristics vary as a function of the torque produced by the engine and thus transmitted by the transmission to the transmission output, a shift control pressure varying with engine torque will provide uniformly smooth shifts. A regulator valve having a base rate determined by a spring acting on the valve element, compressor discharge pressure acting in parallel with said spring on said valve element and an engine output or transmission input speed responsive pressure and the pressure regulated by this regulator valve acting on the valve element in opposition to the spring provide a shift control pressure varying substantially identically with the engine torque.

On overrun, the engine control provides an overrun signal pressure which is used to control the power transfer clutch to provide increased engine braking and to control the transmission pressure for smoother shifting at the increased braking torque. The overrun signal is used to cut off the governor signal, a transmission pressure reducing signal, to increase the transmission pressure during overrun or to increase a bias, the spring bias, on the transmission pressure regulator valve to increase transmission pressure on overrun.

The full nature of the invention, these and further advantages, will be fully apparent from the following description.

Referring to the drawings, FIG. 1 is a schematic diagram of a regenerative free turbine power plant with power transfer, a power shift transmission and interrelated controls.

Figure 1:
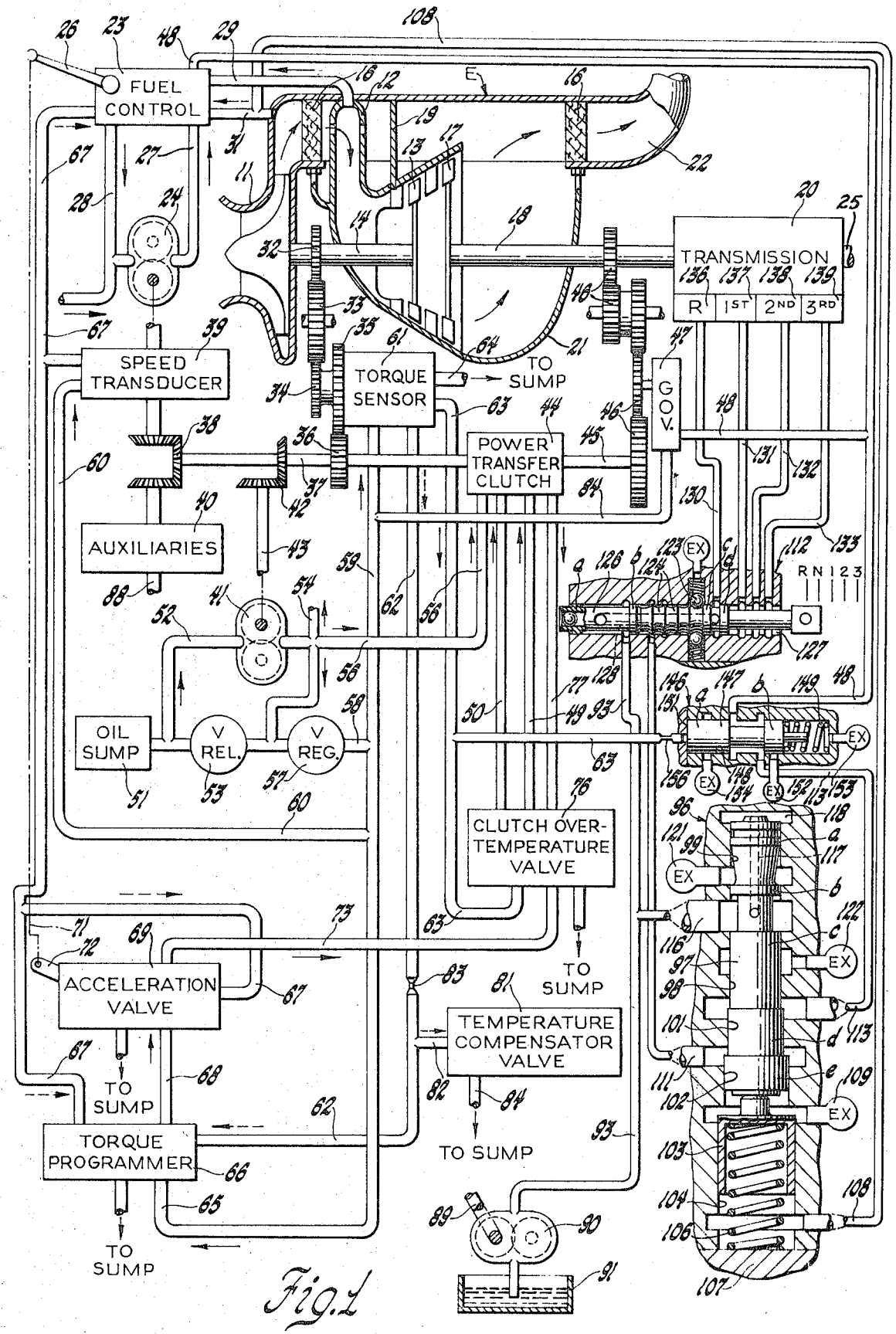

Referring to FIG. 1, the engine E is preferably, although not necessarily, a regenerative engine of the known type described in U.S. Pat. No. 3,077,074 granted Feb. 12, 1963 to John S. Collman, et al., U.S. Pat. No. 3,116,605 granted Jan. 7, 1964 to Amann, et al. and U.S. Pat. No. 3,237,404 granted Mar. 1, 1966 to E. E. Flanigan, et al.; all of common ownership with this application. These engines, developed by the assignee of this invetnion, have been reported upon extensively in the technical literature. For this reason, and also because the present invention may be included in engines of various detailed structure the engine is shown schematically in FIG. 1. The engine E includes centrifugal compressor 11, combustion apparatus 12, and a first or compressor turbine 13 coupled by a shaft 14 to the compressor. These structures are the basic elements of the gas generator. The compressed air is discharged from compressor 11 through a matrix 16 of a radial flow rotary regenerator into the combustion apparatus 12. The exhaust gas from the output load turbine 13 flows through a second, load, or power turbine 17 supported on a power output shaft 18. Turbine 17 exhausts through the matrix 16 to the rear of a bulkhead 19 which divides the matrix into air flow and gas flow zones. Shaft 18 is coupled to the load by a suitable power shift transmission 20 and load or output shaft 25. The engine is enclosed in a case or housing, indicated generally at 21, to confine the motive fluid. The exhaust gas, after passing through the matrix 16, may be discharged to atmosphere through an exhaust passage 22. This schematic shows only a single regenerator, but two may be employed as shown in the first two above-mentioned patents.

The primary control of the engine is of fuel flow to the combustion apparatus. Any appropriate fuel control 23 supplied with fuel by a pump 24 may be employed. Suitable fuel controls are well known, and including this invention in an engine does not require any additions to the fuel control.

Ordinarily, the vehicle operator controls the engine by a hand lever or foot pedal, such as a throttle lever 26 connected to the fuel control. The fuel supplied by the line 28 and pump 24 is delivered through line 27 to the fuel control, and the excess is returned to the pump inlet through line 28, the engine fuel requirement being delivered to the combustion apparatus through line 29. Such fuel controls ordinarily include one or more fuel regulating or metering valves, which are variable throttling valves, and a head regulating valve which controls the metering pressure differential. They may include relief valves and various limiters or safety valves. Fuel flow may be regulated to prevent overspeed, overtemperature, or lean blowout but ordinarily is primarily responsive to some such suitable parameter as compressor discharge pressure. As indicated here, a line 31 pipes compressor discharge pressure into the fuel control. Such controls may include metering means responsive to engine speed and normally include governors to provide normal controls or overspeed protection, or both. This matter will be referred to later.

As so far described, there is a power plant comprising any suitable free turbine engine and any convenient fuel supply and control means therefor. The pump 24 and other engine auxiliaries are ordinarily driven by the gas generator. A chain of gears for this purpose may include a driving gear 32 on shaft 14, idler gear 33, coaxial united gears 34 and 35, and a gear 36 on a main power transfer and accessory drive shaft 37. Shaft 37, through power take-off gearing 38 and the obvious shafting, drives pump 24, a gas generator speed transducer or responsive device 39, and miscellaneous engine or vehicle auxiliaries indicated by the block 40. An oil pump 41 is also driven by the power take-off shafting 37, gears 42 and shaft 43. The speed transducer or governor 39 may be of the type shown in the above U.S. Pat. No. 3,237,404 and may receive pressure fluid by branch line 60 of supply line 58.

With respect to the power transfer function, shaft 37 is connected by clutch 44 to shaft 45 and through a chain of transfer gears 46 to the power turbine output or transmission input shaft 18 and transmission 20. A speed transducer or governor 47 for indicating and control purposes is coupled to the power turbine by gears 46 to provide a governor signal in governor line 48 varying as a function of engine output or transmission input speed, as described below.

Figure 2:
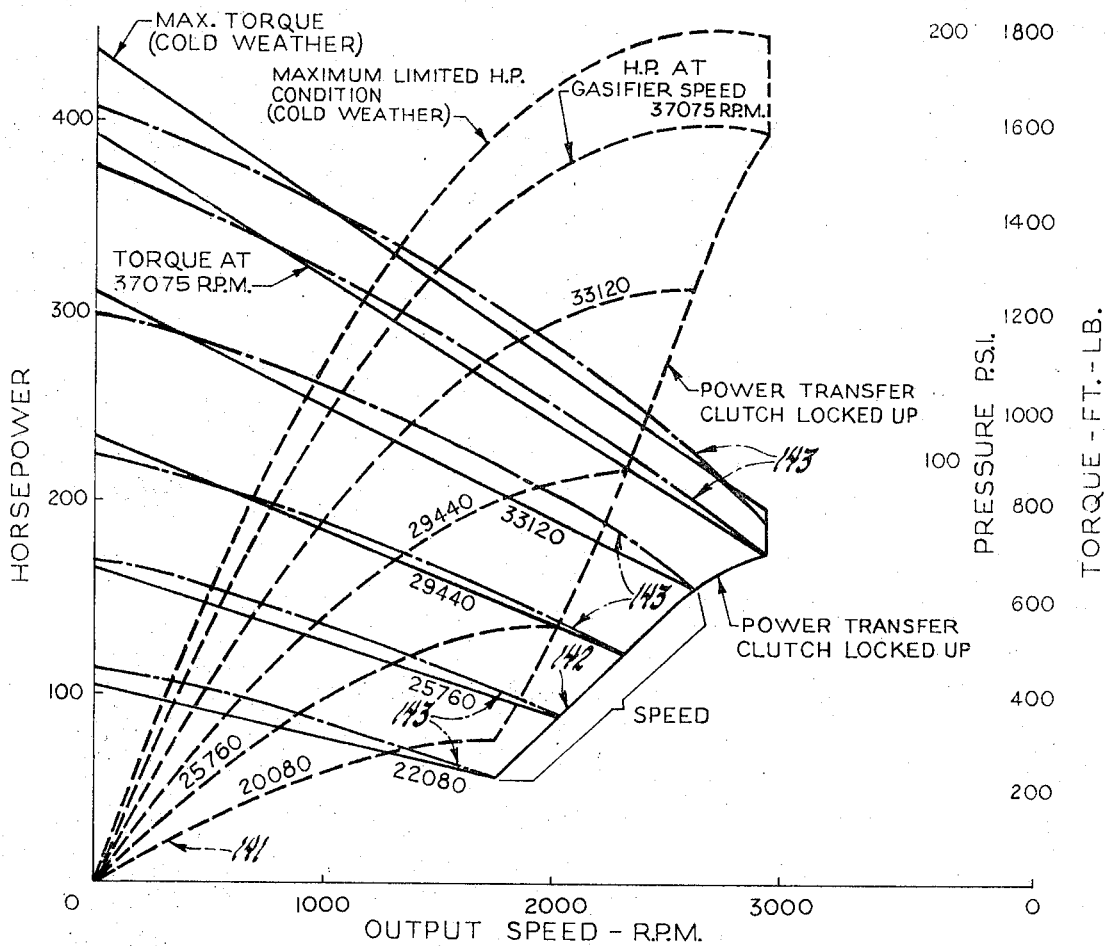
FIG. 2 is a typical map of overall performance, horsepower and torque and transmission shift pressure of the power train in FIG. 1.

The power transfer clutch 44 is shown in detail in FIG. 2 of the above U.S. Pat. No. 3,237,404. It is preferably a multi-plate friction clutch in which the engaging force and, therefore, the torque capacity, is determined by a hydraulic piston. As will become apparent, such a clutch is merely representative of various controllable torque-transmitting mechanisms that may be employed to couple the shafts 14 and 18 at varying speed ratios. The clutch described is provided for both power transfer and braking. Clutch 44 has a housing for a multi-plate friction clutch assembly and rotatably supports the driving and driven elements thereof and shafts 37 and 45. Clutch plates are splined to shaft 45 and rotate with the output shaft and friction disks are splined to shaft 37 and rotate with the input shaft, and both are slidable axially of the shafts.

The clutch is engaged by a double hydraulic motor which has two effective pistons defined by a single annular stepped piston. This piston is slidable in a stepped cavity which defines an inner or power transfer cylinder connected to power signal line 49 and an outer or brake cylinder connected to brake signal line 50. While it is not necessary to have two cylinders, it is preferable to provide a larger cylinder area for braking the load than for power transfer, since the torque during braking may be five or more times the maximum power transfer torque. The piston engages the clutch plates and disks to transmit torque.

Oil under pressure is supplied to the power transfer cylinder by power signal line 49 and is supplied to the brake cylinder by braking signal line 50. Since the clutch is operated as a slipping clutch, a flow of cooling oil is provided. This oil is supplied through a line 56.

The torque transferred by the clutch will be closely proportional to the engaging force exerted by the piston which is proportional to the sum of the products of the pressures in power and brake cylinders by the respective effective piston area minus the force of retraction springs. The brake cylinder is used only to provide a high degree of friction to transmit relatively large amounts of power from the power turbine to the compressor to brake the output shaft on overrun. The power cylinder is supplied fluid under controlled pressure to determine the amount of torque transmitted in normal operation of the turbine at part-load. It is also energized to assist in providing clutching force for overrun braking, along with the brake cylinder.

In FIG. 1, the oil which is supplied to clutch 44 is circulated under pressure by pump 41 driven by the gas generator. This oil is drawn from a source such as a sump 51 through a suction line 52 and the pressure is limited by a suitable relief valve 53. Pump 41 may supply oil for engine lubrication through restricted lubrication line 54 or it may be independent of the lubricating system. The clutch cooling oil is supplied through cooling line 56 to the clutch 44. Pump 42 also supplies oil for control and servo purposes, the pressure of which is held constant by a constant pressure regulating valve 57 which regulates control pressure in supply line 56.

Figure 3:
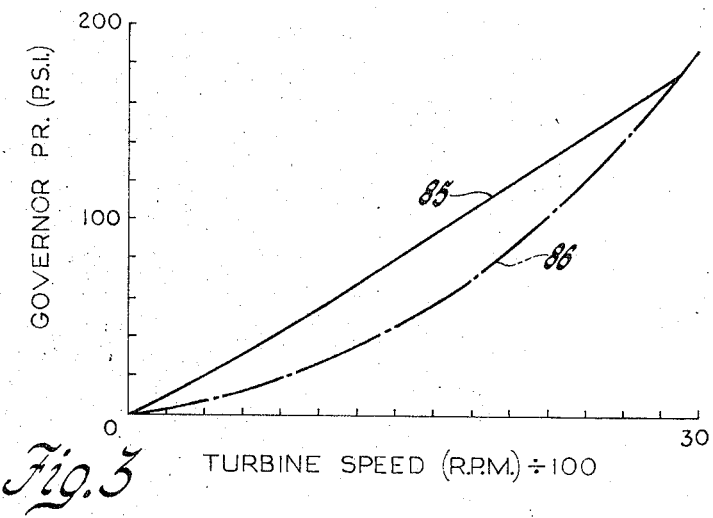
FIG. 3 is a plot showing governor pressure variation with speed.

One of the basic elements of control of power transfer in the system of FIG. 1 is a torque sensor 61, illustrated in detail in FIG. 3 of the above U.S. Pat. No. 3,237,404. The torque sensor responds to the torque transmitted through the intermediate gears 34, 35 from the gas generator turbine to the several auxiliary and power transfer shafts.

Controlled pressure servo oil supplied by regulating valve 57 through line 58 and branch passage 59 enters the torque sensor. This pressure provides the torque signal in line 62 input to means which supplies controlled pressure by power signal line 49 to the power cylinder to control the power transfer clutch 44 during normal drive. The brake or overrun signal line during normal forward drive is connected to exhaust 64.

Under torque reversal the torque sensor 61 causes pressure in line 62 to drop to zero by connecting this line to exhaust 64. Thus, no torque signal (zero pressure) is transmitted through line 62. This signal acts through the torque programmer 66 described in above U.S. Pat. No. 3,237,404 to control the system to cause full oil pressure to be applied through line 49 to the power cylinder of clutch 44. The torque sensor then connects line 59 to brake signal line 63 which is connected to brake cylinder line 50 to apply full pressure to the brake cylinder of clutch 44. The maximum piston area is thus available to engage or lock up the clutch so as to transmit a torque corresponding to a desired large fraction of engine power rating, such as about 60 percent thereof.

In normal running, the power transfer clutch 44 is controlled to transmit a desired value of torque by comparing the measured torque from the torque sensor 61 with a desired torque or power transfer signal from a torque programmer 66. The torque programmer is an automatic valve which controls the power transfer clutch piston in response to inputs of actual torque output of the gas generator and actual speed of the gas generator. It acts upon oil supplied by pump 41 and line 65 to clutch 44. The torque sensor pressure is transmitted through line 62 as explained above. The speed signal is a fluid pressure signal transmitted through line 67 from the speed transducer 39. Servo oil at controlled pressure is supplied through line 58 and branch 60.

The torque programmer valve 66, controlled by torque sensor pressure in line 62 and gasifier speed transducer pressure in line 67, supplies servo oil from supply line branch 65 to, or bleeds it from, torque programmer line 68 to sump for controlling the clutch 44, thus varying the torque. The amount of torque transferred is one factor which determines the operation of this valve. The clutch will therefore be controlled to maintain the transfer shaft torque output of the gas generator at a value which is a function of speed related to the characteristics of the particular engine so that turbine temperature is maintained substantially constant at varying power levels. The no torque signal upon torque reversal will always supply oil to line 68 regardless of engine speed.

The structure so far described, plus lines to conduct the actuating oil to the clutch, constitutes a complete operating system. However, certain additional devices preferably included in the system are illustrated and will now be described. First, acceleration valve 69, interposed in the line from the torque programmer to the clutch, which improves the acceleration of the engine. Since the effect of the torque programmer is to maintain a high turbine temperature at part loads, there is not much margin for addition of fuel to accelerate the gas generator, both with regard to turbine temperature limits and the compressor surge threshold. The compressor operates closer to the surge line during power transfer. This is desirable to increase running efficiency, but it impedes acceleration. If the engine is running at light load, the gas generator will be turning well below full speed. To assume full load or to accelerate the load rapidly, it is necessary to accelerate the gas generator to full speed. This can be facilitated by temporarily cutting out the power transfer so that all of the power of the gas generator is available to accelerate it. While various means might be adopted, the acceleration valve 69 as shown in the above U.S. Pat. No. 3,237,404, is very simple and suitable for this purpose. This valve responds to substantial power increasing movements of the power control or throttle lever 26, connected by rod 71 and lever 72, to release or unload the power transfer clutch. It is not affected by small or slow movements.

Communication is normally maintained between the torque programmer and through the acceleration valve which connects to a line 73 leading to the clutch over temperature valve 76 and line 49 to the power transfer cylinder of clutch 44. Slight movements of the throttle lever 26 will not shift the valve sufficiently to drain the clutch cylinder, but more substantial differences between the speed setting and actual speed will release fluid from the clutch, thus unloading the gas generator and improving its acceleration.

A further desirable element of the system is a clutch overtemperature valve 76. The purpose of this valve is to release or relieve the clutching or braking effort in response to too great generation of heat in the clutch because of overload and excess slip. For this reason, an automatic valve responsive to the temperature of cooling air leaving the clutch may be connected in circuit with the brake and clutch cylinder energizing lines. The cooling oil discharged from the clutch flows through an exhaust line 77 to the clutch overtemperature valve 76 and is discharged from this valve to the sump. The power transfer clutch energizing line 73 enters the valve 76 and is connected through it to a line 49 leading to the power cylinder in the clutch. The brake energizing oil line 63 is connected through the overtemperature valve to line 50 which connects with the brake cylinder in the clutch.

The overtemperature valve 76 is a balanced spool valve responsive to cooling oil temperature and movable to cut off the two lines which carry servo oil to the clutch by an oil temperature responsive capsule exposed to cooling oil discharged from the clutch through line 77. Transfer clutch oil line 73 and the brake-engaging fluid line 63 are throttled and closed by the valve in response to overtemperature. The overtemperature valve is responsive to conditions indicative of possible clutch misuse, i.e., misoperation of the engine causing excessive clutch slippage.

Another element which may improve this system, under some conditions at least, is means for modifying the schedule of power transfer as a function of air temperature. The turbine inlet temperature of a gas turbine engine increases with increases in ambient air temperature. For constant turbine temperature, fuel and therefore power must be reduced as air temperature increases. The torque transfer schedule may vary as a function of ambient temperature, which is desirable to make the gas generator turbine inlet temperature insensitive to ambient temperature. The preferred mode of accomplishing this in the system of FIG. 1 lies in means for varying the value of torque transmitted from the torque sensor to the torque programmer by action of a temperature compensator. The temperature compensator 81 is connected so as to bleed oil from the line 62 through a branch line 82. In addition, if the temperature compensator is employed, a restriction 83 is provided in the line 62 upstream of the branch line 82. Restriction 83 allows a pressure drop to be created in line 62 as oil is bled from it by compensator 81. The compensator 81 includes a valve variably throttling the passage from inlet line 82 to an output or sump port 84 controlled by a known temperature responsive device exposed to ambient atmospheric or engine inlet temperature, to open the valve and thus reduce the torque sense by the additional drop through orifice 83 as air temperature decreases. By thus reducing the torque sense, the torque programmer 66 closes off the supply of pressure oil to the power transfer clutch at a higher value of torque as air temperature decreases. The result is that the level of power transfer varies reversely to inlet or ambient air temperature.

The governor 47 is preferably a linear governor, constructed, for example, in accordance with U.S. Pat. No. 2,941,539 granted June 21, 1960 to L. O. Hewko and providing a governor signal in line 48 that varies as a linear function of the engine output or transmission input speed, solid line curve 85, FIG. 3, since it is driven by gearing 46 or a member in the transmission rotating with or at a constant reduction ratio with the transmission input. A supply line branch 84 of supply line 58, 59 provides control fluid to this governor. Governor line 48 may be connected to fuel control 23 to provide output speed control as required by some engine fuel controls. Governor 47 may also be made like the speed transducer of the above U.S. Pat. No. 3,237,404 or the pitot governor of U.S. Pat. No. 3,039,315 granted June 19, 1962 to R. M. Zeek and E. E. Flanigan which operates from lubricating oil and does not need supply branch 84. Both of these governors provide a governor signal that varies as an exponential function of speed as indicated by dot dash curve 86, FIG. 3.

The transmission control system requires a supply of control fluid during all phases of operation. When the transmission 20 does not have a fluid drive, a fluid coupling or a torque converter, the engine output shaft 18 will stall when the transmission output or vehicle is stationary and the transmission is in a ratio drive. However, the first turbine 13 will continue to drive the compressor 11 and auxiliary drive so pump 41 is driven providing engine control pressure in line 58 regulated by regulator valve 57.

The transmission control system has a transmission input driven pump 90 which pumps fluid from the transmission sump 91 and delivers the fluid under pressure to the main line 93. The pump 90 is located in the engine and driven by the auxiliary drive shaft 37, preferably through gearing 38 and the drive shaft for auxiliaries 40. This auxiliary drive shaft has an extension shaft 88 suitably connected to shaft 89 of pump 90. The pump 90 will provide transmission control fluid when the engine is idling or driving since it is driven by the compressor, for regulation by regulator valve 96.

The main line regulator valve 96 has a valve element 97 having lands $a$, $b$, $c$, $d$ and $e$ reciprocating in a stepped bore 98. The lands $a$, $b$ and $c$ have the same small equal diameter and are located in the small diameter bore portion 99. The land $d$ has an intermediate diameter and is located in bore portion 101. The large diameter land $e$ is located in large diameter bore portion 102. A piston 103 is reciprocally mounted in the largest bore portion 104. A spring 106 seated on an end wall 107 sealing the end of the bore portion 104 engages piston 103 to urge it into contact with the valve element to spring bias the valve element to regulating position. The bore portion 104 below piston 103 is continuously connected by line 108 to compressor discharge pressure line 31 to supply gas turbine engine compressor discharge pressure to bore 104 to act on piston 103 to bias the regulator valve element 97 to increase the bias as a function of compressor discharge pressure. The bore space between valve element 97 and piston 103 is vented by exhaust 109.

A neutral forward signal line 111 from the shift control valve 112 is connected to bore 98 at the step between bore portions 101–102 to act on the unbalanced area of land $e$ and constantly reduce main line pressure in neutral and all forward drive positions so the main line pressure is increased on a shift to reverse drive.

The governor or speed sensor 47 may be of the pitot tube type and receive lubrication fluid and deliver a governor pressure proportional to transmission input speed to governor line 48 having a square type curve 86, FIG. 3. The governor may be driven by gears 46 as shown, or located in the transmission and driven at input speed or a reduced speed varying as a function of input speed. The governor line 48 is connected when the engine is driving by overrun valve 146 and governor line 113 to bore 98 at the step between bore portions 99 and 101 and acts on the unbalanced area of land $d$ to reduce main line pressure as a function of increasing governor pressure or input speed.

The main line 93 has a branch 116 connected to bore portion 99 and in fluid communication with the space between lands $b$ and $c$ in all regulating positions of the valve element. The space between lands $b$ and $c$ is connected by passage 117 to the end of valve element 97 to the closed end chamber 118 at the end of bore portion 99 so main line fluid is connected through passage 117 to chamber 118 to act on land $a$. Damping is provided by a restriction in passage 117 or other suitable damping means. The space between lands $a$ and $b$ is vented by exhaust 121. Excess pressure in the main line 93 acting in chamber 118 on land $a$ moves the valve element 97 to connect main line brach 116 to exhaust 122 to lower the pressure.

The shift control valve 112 shown is a manual type having a conventional ball detent 123 and detent grooves 124 to releasably hold the valve in each position but other manual and automatic shift controls may be used. The shift valve 112 has a valve element 126 having equal diameter lands $a$, $b$, $c$ and $d$ reciprocal in a bore 127. The main line is connected to bore 127 between lands $a$ and $b$ in all valve positions and through central passage 128 in the valve element 126 to the space between lands $c$ and $d$. This valve in each drive position, reverse R, first 1, second 2 and third 3, connects main line 93 to the reverse line 130, first line 131, second line 132 and third line 133. These lines are respectively connected to the fluid actuated drive engaging devices for engaging reverse 136, first 137, second 138 and third 139.

The overrun valve 146 cuts off governor pressure to the regulator valve 96 during overrun to provide a higher main line or transmission pressure to properly operate the transmission to transmit the higher engine braking torque on the transmission. The overrun valve 146 has a valve element 147 having equal diameters lands $a$ and $b$ in a bore 148. A spring 149 in the spring chamber end of bore 148 biases the valve element to the drive or open position shown connecting governor line 48 to governor line 113. The engine overrun or braking signal line 63 is connected to the closed chamber 151 at the other end of bore 148. Exhaust 152 is blocked by land 147$b$. The spring chamber end of bore 148 is vented by exhaust 153. Exhaust 154 prevents leakage across land $a$ so governor signal pressure and overrun signal pressure do not affect each other. On overrun, the overrun pressure line 63 supplies this pressure to chamber 151 to move the valve against the spring to connect downstream governor line 113 to exhaust 152 and land 147$a$ blocks upstream governor line 48 to cut off governor pressure to land $d$ of regulator valve 96. Since governor pressure increasingly reduces transmission pressure with increasing speed, this effects an increasing degree of transmission pressure increase with increasing transmission pressure in response to overrun. The torque sensor 61 has sufficient time delay in the mechanism or a time delay restriction 156 may be in overrun signal line 63 so an overrun signal is not provided on momentary torque reversals that may occur during power shifting.

Figure 4:
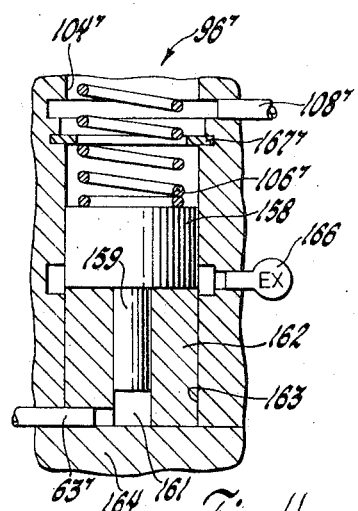
FIG. 4 is a partial schemation of a modified regulator valve.

A modified overrun transmission pressure increase control is shown in FIG. 4. The FIG. 1 system may be modified by omitting overrun valve 146 and employing a modified transmission regulator valve 96', like valve 96, except that spring 106' is seated on a movable abutment 158 reciprocal in bore 104' and having a piston portion 159 reciprocal in a bore 161 of a sleeve member 162 fixed in an extended portion 163 of bore 104'. The closure 164 closes the end of bores 161 and 163 and fixes sleeve 162 in the bore 163. An exhaust 166 vents the step between bores 104' and 161. When overrun signal pressure from line 63' enters bore 61 and acts on piston 159 to raise spring abutment 158 to increase the spring bias and increase transmission pressure on overrun, such increase may be limited by overrun pressure value or snap ring 167' which limited movement of abutment 158. This arrangement provided an increased transmission pressure due to increased spring bias. Gasifier pressure from line 108' will also be high on overrun and this increases as a function of engine braking to further increase transmission pressure as a function of increasing braking torque for proper transmission operation at increased torque during overrun.

The operation, while basically described above in connection with the structural description is further explained with reference to the curves of FIGS. 2 and 3. The engine operates as described in the above U.S. Pat. No. 3,237,404. Assume that the engine is running normally, for example, at a minimum idling power level; the gas generator turbine 13 drives the auxiliaries including the speed transducer 39. Under these idling conditions, a little gas horsepower is available to the power turbine, and it may rotate idly or may be stationary, if the load is coupled to it. The power transfer clutch 44 will be open. To extract substantial power from the engine, the gas generator must be accelerated by increasing the fuel rate so as to provide more gas energy to the power turbine. Above a low idle speed, the control system begins through torque programmer 66 to provide variable slip engagement of the power transfer clutch.

Referring specifically to the system of FIG. 1, in the operation of the engine the power level is determined by the manual lever 26 which controls fuel supply. The power transfer clutch extracts some power from the gas generator turbine and assists the power turbine in driving the load through transmission 20. The speed of the gas generator is measured by the transducer 39 which may provide a speed signal to the fuel control and provides a speed signal to the torque programmer 66 and the acceleration valve 69. The torque sensor 61 provides a torque signal through line 62 to the torque programmer, which signal may be trimmed or compensated for air temperature by the temperature compensator valve 81, if it is provided. The torque programmer acts to control the pressure of fluid to the power transfer clutch, adjusting the pressure so that the torque extracted from the gas generator equals that programmed or scheduled by the torque programmer as a function of engine speed.

In many cases, it is also highly desirable to provide positive means to brake the load and also to provide a positive restraint on overspeed of the power turbine when there is no load or upon disengagement of the turbine from the load, for instance. This is accomplished through the same power transfer clutch by energizing it in response to overruning of the gas generator by the power turbine, or power flow from the power turbine back to the gas generator, so that the compressor 11 can be driven by the shaft 18. The amount of reverse torque transmitted during braking ordinarily needs to be limited, out of regard to the strength of the transfer gear installation. Obviously, the ratio of speeds of the two turbines during braking may be any appropriate value, as the ratio of the gears coupling the turbine shafts to the clutch may be as desired.

As fully explained in the above U.S. Pat. No. 3,237,404 the engine control system employs input speed and torque to control the amount of power transferred by the power transfer clutch to maintain turbine inlet temperature at a proper high value and obtain very good values of specific fuel consumption or high efficiency.

The nature of the characteristic power and torque curves for a typical engine with such power transfer are shown in FIG. 2. It will be noted that the output shaft horsepower, shown by the family of horsepower curves 141, dotted lines, is relatively low below 70 percent gas generator speed but increases rapidly in the higher range of gas generator speed up to 100 percent, which is the normal maximum gas generator speed, 37,075 RPM The power also increases with power turbine or output speed but levels off at the higher power turbine speeds. The line indicated as "power transfer clutch locked up" represents the condition under which the power turbine tends to overrun the gas generator turbine and the power transfer clutch is strongly engaged to brake the power turbine, and thus the load. To the left of this line, the power transfer clutch slips under controlled torque.

Such an engine and control system provides torque in accordance with the solid line family of torque curves 142, FIG. 2, which vary substantially as a linear function of output speed at each gasifier speed and vary as a function of gasifier speed as indicated by the curves at different gasifier speeds. The family of torque curves also terminate at the line indicated as "power transfer clutch locked-up." Since all transmission shifts during engine drive operation would be in the range of operation illustrated by these curves, the curves in the further maximum speed range have not been illustrated. The torque will continue to drop with increasing speed and transmission pressure will decrease with increasing speed and increase with increasing gasifier discharge pressure, to provide a transmission pressure adequate to maintain ratio engagement. The drive establishing devices 136, 137, 138 and 139 each include a friction device, i.e., a clutch or a brake, and a fluid motor for operating the friction device with a force proportional to the fluid pressure supplied to the fluid motor. Each forward drive establishing device has its friction device, fluid motor and retraction springs designed so that the torque transmitted by each forward drive establishing device varies with a predetermined, normally substantially the same, relationship with the pressure supplied to it. Thus a single controlled pressure proportional to engine torque will establish each forward drive with the same degree of initial and engaging slip for consistently smooth shift feel and provide sufficient pressure, but not an excess, to maintain drive.

The regulator valve 96 regulates a transmission control pressure in main line 93 proportional to engine torque. The spring 106 establishes a base pressure which is increased as a function of increasing gasifier discharge pressure supplied by line 108, decreased as a function of increasing engine output or transmission input governor pressure supplied by line 48 and decreased by neutral forward knockdown pressure as a function of increasing main line pressure. When the governor 47 is of the linear type disclosed above providing a governor pressure varying as a linear function of transmission input speed as shown by curve 85 the main line pressure will vary substantially as a function of engine torque and is illustrated by the same solid line curves representing engine torque in FIG. 2. When the governor 47 is of the exponential type, i.e., hyperbolic or square, as disclosed above providing an exponential governor pressure curve such as curve 86, the main line pressure will vary substantially with engine torque as shown by the family of pressure curves 143 (dot dash lines) in FIG. 2. Since each drive engaging operation during shifting is effected by a pressure providing an engaging speed and force varying as a function of the engaging pressure and the engaging pressure varies with torque uniform smooth shifting with the proper amount of slip of the friction devices is provided.

During overrun operation the engine can absorb more torque and thus the transmission pressure employed to engage the ratios is increased as a function of overrun operation torque to maintain the proper relationship between this torque which is transmitted by the transmission and the transmission operating pressure for smooth shifting. As shown in FIG. 1 the overrun signal line 63 which controls the power transfer clutch 44 for the engine braking mode of operation of the engine also controls the overrun valve 146 to control governor line 48–113 to cut off the supply of the governor pressure to regulator valve 96. Governor pressure in engine drive operation increasingly reduces transmission operating pressure in main line 93 with increasing governor pressure and engine output or transmission input speed. Thus when the governor pressure is removed the overrun mode transmission pressure is increased relative to the drive mode transmission pressure with increasing speed. The overrrun mode transmission operating pressure is thus varied as a function of the gasifier pressure which varies as a function of engine braking torque. Thus the overrun mode transmission operating pressure varies with overrun braking torque transmitted by the transmission and braked by the engine. The modification shown in FIG. 1 as modified by the showing in FIG. 4 uses the high pressure overrun signal in line 63' to increase overrun mode operating pressure. The other signals continue to control transmission pressure as during drive operation. The engine power transfer clutch and control in this arrangement has a torque capacity with the control pressure acting on both pistons during overrun braking for power transfer limited to a high torque value which occurs at a high speed and thereafter in a maximum speed range provides a constant high maximum torque transfer to similarly limit engine overrun braking torque to a high value in a maximum speed range. Since the overrun relay valve 146 is not used in this modification, the overrun mode transmission pressure is regulated in the same manner as in the engine drive mode and this pressure is further boosted by the overrun signal to provide a high transmission pressure to handle the maximum torque transmitted by the transmission and braked by the engine.

The foregoing description of a preferred embodiment of the invention will make its principles and advantages clear and many modifications of structure and organization within the principles thereof will be apparent.

It is claimed:

1. A power train comprising: in combination; a gas turbine power plant having a gas generator including a compressor providing a gas discharge pressure and combustion apparatus, turbine means gas-coupled to the gas generator, control means controlling the gas generator to provide a programmed output torque varying with compressor speed and turbine means speed; and a power shift transmission having an input operatively connected to said turbine means, a load output and a plurality of fluid-operated drive establishing devices for establishing a plurality of ratio drives between said input and output, governor means operatively connected to said turbine means providing a governor signal proportional to the speed of said turbine means, a source of fluid under pressure, regulator valve means operatively connected to said source, compressor and governor means regulating the pressure substantially proportional to the programmed engine output torque in response to gas discharge pressure and engine turbine means speed and shift control means operatively connected to said regulator valve means, and fluid operated drive establishing devices and operative under the control of said pressure regulated by said regulator valve means and selectively operating said devices for selectively engaging said drives.

2. A power train comprising: in combination: a gas turbine power plant having a gas generator including a compressor providing a gas discharge pressure and combustion apparatus, turbine means gas-coupled to the gas generator, control means controlling the gas generator to provide a programmed output torque varying with compressor speed and turbine means speed; and a power shift transmission having an input operatively connected to said turbine means, a load output and a plurality of fluid-operated drive establishing devices for establishing a plurality of ratio drives between said input and output, governor means operatively connected to said turbine means providing a governor signal proportional to the speed of said turbine means, a source of fluid under pressure, regulator valve means operatively connected to said source, compressor and governor means regulating the pressure substantially proportional to the programmed engine output torque in response to gas discharge pressure and speed of said engine turbine means and shift control means operatively connected to said regulator valve means and fluid operated drive establishing devices and operative to selectively operate said devices for selectively engaging said drives under the control of said pressure regulated by said regulator valve means, said fluid operated devices providing smooth engagement slip characteristics in response to fluid pressure varying as a function of the torque being transmitted and said shift control means selectively supplying said pressure regulated by said regulator valve means to said fluid operated drive establishing devices to establish each drive with a pressure proportional to the torque being transmitted.

3. A power train comprising: in combination: a gas turbine power plant having a gas generator including a compressor providing a gas discharge pressure and combustion apparatus, turbine means gas-coupled to the gas generator, control means controlling the gas generator to provide a programmed output torque varying with compressor speed and turbine means speed; and a power shift transmission having an input operatively connected to said turbine means, a load output and a plurality of fluid-operated drive establishing devices for establishing a plurality of ratio drives between said input and output, governor means operatively connected to said turbine means providing a governor signal proportional to the speed of said turbine means, a source of fluid under pressure, regulator valve means operatively connected to said source, compressor and governor means regulating the pressure substantially proportional to the programmed engine output torque in response to gas discharge pressure and speed of said engine turbine means and shift control means operatively connected to said regulator valve means and fluid operated drive establishing devices and operative under the control of said pressure regulated by said regulator valve means and selectively operating said devices for selectively engaging said drives and said regulator valve means having a regulator valve element biased by a spring for establishing a base pressure, by gas discharge pressure to increase the base regulated pressure as a direct function of increasing gas discharge pressure and by said governor signal to decrease said base pressure as a direct function of increasing speed to provide a regulated pressure substantially proportional to engine output torque.

4. The invention defined in claim 3 and said fluid operated devices providing smooth engagement slip characteristics in response to fluid pressure varying as a function of the torque being transmitted and said shift control means selectively supplying said pressure regulated by said regulator valve means to said fluid operated drive establishing devices to establish each drive with a pressure proportional to the torque being transmitted.

5. A power train comprising: in combination: a gas turbine power plant having a gas generator including a compressor providing a gas discharge pressure and combustion apparatus, turbine means gas-coupled to the gas generator, control means controlling the gas generator to provide a programmed output torque varying with compressor speed and turbine means speed; and a power shift transmission having an input operatively connected to said turbine means, a load output and a plurality of fluid-operated drive establishing devices for establishing a plurality of ratio drives between said input and output, governor means operatively connected to said turbine means providing a governor signal proportional to the speed of said turbine means, a source of fluid under pressure, regulator valve means operatively connected to said source, compressor and governor means regulating the pressure substantially proportional to the programmed engine output torque in response to gas discharge pressure and speed of said engine turbine means, shift control means operatively connected to said regulator valve means and fluid operated drive establishing devices and operative to selectively operate said devices for selectively engaging said drives under the control of said pressure regulated by said regulator valve means, said control means providing during engine drive operation said programmed output torque and during overrun braking operation a programmed engine braking torque and an overrun signal and said regulator valve means being connected to said control means and further operative during overrun braking in response to said overrun signal to provide a regulated pressure varying as a function of engine braking torque.

6. The invention defined in claim 5 and said regulator valve means including means responsive to said overrun signal to disable the action of said governor signal on said regulator valve means.

7. The invention defined in claim 5 and said regulator valve means including means responsive to said overrun signal to increase the regulated pressure as a function of the pressure of the overrun signal.

8. A power train comprising: in combination; a gas turbine power plant having a gas generator including a compressor providing a gas discharge pressure combustion apparatus, and a compressor turbine driving the compressor; a load turbine gascoupled to the gas generator; controllable torque-transmitting means coupling the turbines including control means controlling the amount of torque transmitted, and means responsive to a condition of the gas generator indicative of torque available from the gas generator as shaft power within allowable limits of gas generator turbine temperature connected to said torque controlling means to control the torque transmitted so as to load the gas generator turbine variably with decrease in engine power level to maintain a high gas generator turbine temperature at light loads and provide a programmed output torque varying with compressor speed and load turbine speed; and a power shift transmission having an input operatively connected to said load turbine, a load output and a plurality of fluid-operated drive establishing friction devices having engagement slip characteristics related to the torque being transmitted for establishing a plurality of ratio drives between said input and output, governor means operatively connected to said load turbine providing a governor signal proportional to the speed of said load turbine, a source of fluid under pressure, regulator valve means operatively connected to said source, compressor and governor means regulating the pressure substantially proportional to the programmed engine output torque in response to gas discharge pressure and engine output speed and shift control means operatively connected to said regulator valve means and fluid operated drive establishing devices for selectively operating said devices for selectively engaging said drives with said pressure regulated by said regulator valve means to provide uniform engagement slip characteristics for smooth shifting at all torques.

9. The invention defined in claim 8 and said fluid operated devices providing smooth engagement slip characteristics in response to fluid pressure varying as a function of the torque being transmitted and said shift control means selectively supplying said pressure regulated by said regulator valve means to said fluid operated drive establishing devices to establish each drive with a pressure proportional to the torque being transmitted.

10. A power train comprising: in combination; a gas turbine power plant having a gas generator including a compressor providing a gas discharge pressure combustion apparatus, and a compressor turbine driving the compressor; a load turbine gas-coupled to the gas generator; controllable torque-transmitting means coupling the turbines including control means controlling the amount of torque transmitted, and means responsive to a condition of the gas generator indicative of torque available from the gas generator as shaft power within allowable limits of gas generator turbine temperature connected to said torque controlling means to control the torque transmitted so as to load the gas generator turbine variably with decrease in engine power level to maintain a high gas generator turbine temperature at light loads and provide a programmed output torque varying with compressor speed and load turbine speed; and a power shift transmission having an input operatively connected to said load turbine, a load output and a plurality of fluid-operated drive establishing friction devices having engagement slip characteristics related to the torque being transmitted for establishing a plurality of ratio drives between said input and output, governor means operatively connected to said load turbine providing a governor signal proportional to the speed of said load turbine, a source of fluid under pressure, regulator valve means operatively connected to said source, compressor and governor means regulating the pressure substantially proportional to the programmed engine output torque in response to gas discharge pressure and engine output speed and shift control means operatively connected to said regulator valve means and fluid operated drive establishing devices for selectively operating said devices for selectively engaging said drives with said pressure regulated by said regulator valve means to provide uniform engagement slip characteristics for smooth shifting at all torques, and said regulator valve means having a regulator valve element biased by a spring for establishing a base pressure, by gas discharge pressure to increase the base regulated pressure as a direct function of increasing gas discharge pressure and by said governor signal to decrease said base pressure as a direct function of increasing speed to provide a regulated pressure substantially proportional to engine output torque.

11. The invention defined in claim 10 and said fluid operated devices providing smooth engagement slip characteristics in response to fluid pressure varying as a function of the torque being transmitted and said shift control means selectively supplying said pressure regulated by said regulator valve means to said fluid operated drive establishing devices to establish each drive with a pressure proportional to the torque being transmitted.

12. A power train comprising: in combination; a gas turbine power plant having a gas generator including a compressor providing a gas discharge pressure combustion apparatus, and a compressor turbine driving the compressor; a load turbine gascoupled to the gas generator; controllable torque-transmitting means coupling the turbines including control means controlling the amount of torque transmitted, and means responsive to a condition of the gas generator indicative of torque available from the gas generator as shaft power within allowable limits of gas generator turbine temperature connected to said torque controlling means to control the torque transmitted so as to laod the gas generator turbine variably with decrease in engine power level to maintain a high gas generator turbine temperature at light loads and provide a programmed output torque varying with compressor speed and load turbine speed; and a power shift transmission having an input operatively connected to said load turbine, a load output and a plurality of fluid-operated drive establishing friction devices having engagement slip characteristics related to the torque being transmitted for establishing a plurality of ratio drives between said input and output, governor means operatively connected to said load turbine providing a governor signal proportional to the speed of said load turbine, a source of fluid under pressure, regulator valve means operatively connected to said source, compressor and governor means regulating the pressure substantially proportional to the programmed engine output torque in response to gas discharge pressure and engine output speed and shift control means operatively connected to said regulator valve means and fluid operated drive establishing devices for selectively operating said devices for selectively engaging said drives with said pressure regulated by said regulator valve means to provide uniform engagement slip characteristics for smooth shifting at all torques, said control means providing during engine drive operation said programmed output torque and during overrun braking operation a programmed engine braking torque and an overrun signal and said regulator valve means being connected to said control means and further operative during overrun braking in response to said overrun signal to provide a regulated pressure varying as a function of engine braking torque.

13. The invention defined in claim 12 and said regulator valve means including means responsive to said overrun signal to disable the action of said governor signal on said regulator valve means.

14. The invention defined in claim 12 and said regulator valve means including means responsive to said overrun signal to increase the regulated pressure as a function of the pressure of the overrun signal.

15. A power train comprising; in combination; a gas turbine power plant having a gas generator including a compressor providing a gas discharge pressure and combustion apparatus, turbine means gas coupled to the gas generator, control means controlling the gas generator and turbine means to provide a programmed output torque varying with compressor speed, turbine speed and torque to provide an engine drive torque program and an overrun drive torque program and an overrun signal; and a power shift transmission having an input operatively connected to said turbine means, a load output and a plurality of fluid operated drive establishing devices having engagement slip characteristics related to the torque being transmitted for establishing a plurality of ratio drives between said input and said output, governor means operatively connected to said transmission input providing a governor signal proportional to the speed of said transmission input, a source of fluid under pressure, regulator valve means operatively connected to said source, compressor, governor means and engine control means regulating the pressure in response to said gas discharge pressure, said transmission input speed and said overrun signal substantially proportional to engine output torque in the engine drive mode and in the engine overrun braking mode substantially proportional to engine torque in the engine overrun braking mode of operation.

* * * * *

PO-1050
(5/69)

UNITED STATES PATENT OFFICE
CERTIFICATE OF CORRECTION

Patent No. 3,851,463     Dated December 3, 1974

Inventor(s) Donovan L. Robinson

It is certified that error appears in the above-identified patent and that said Letters Patent are hereby corrected as shown below:

In the Specification: Column 1, line 7, "shaft" should be -- shift --; Column 2, line 20, "invetnion" should be -- invention --; Column 4, line 1, "area" should be -- areas --, line 23, numeral "56" should be -- 58 --; Column 5, line 61, "air" should be -- oil --; Column 8, line 8, "brach" should be -- branch --; Column 9, line 64, "tubine" should be -- turbine --; Column 10, line 31, after "be" insert -- made --.

Signed and sealed this 1st day of July 1975.

(SEAL)
Attest:

RUTH C. MASON
Attesting Officer

C. MARSHALL DANN
Commissioner of Patents
and Trademarks